April 22, 1958  G. T. W. GRIEVE  2,831,656
APPARATUS FOR APPLYING METAL SHEATHS TO ELECTRIC CABLES
Original Filed Aug. 16, 1954  6 Sheets-Sheet 1
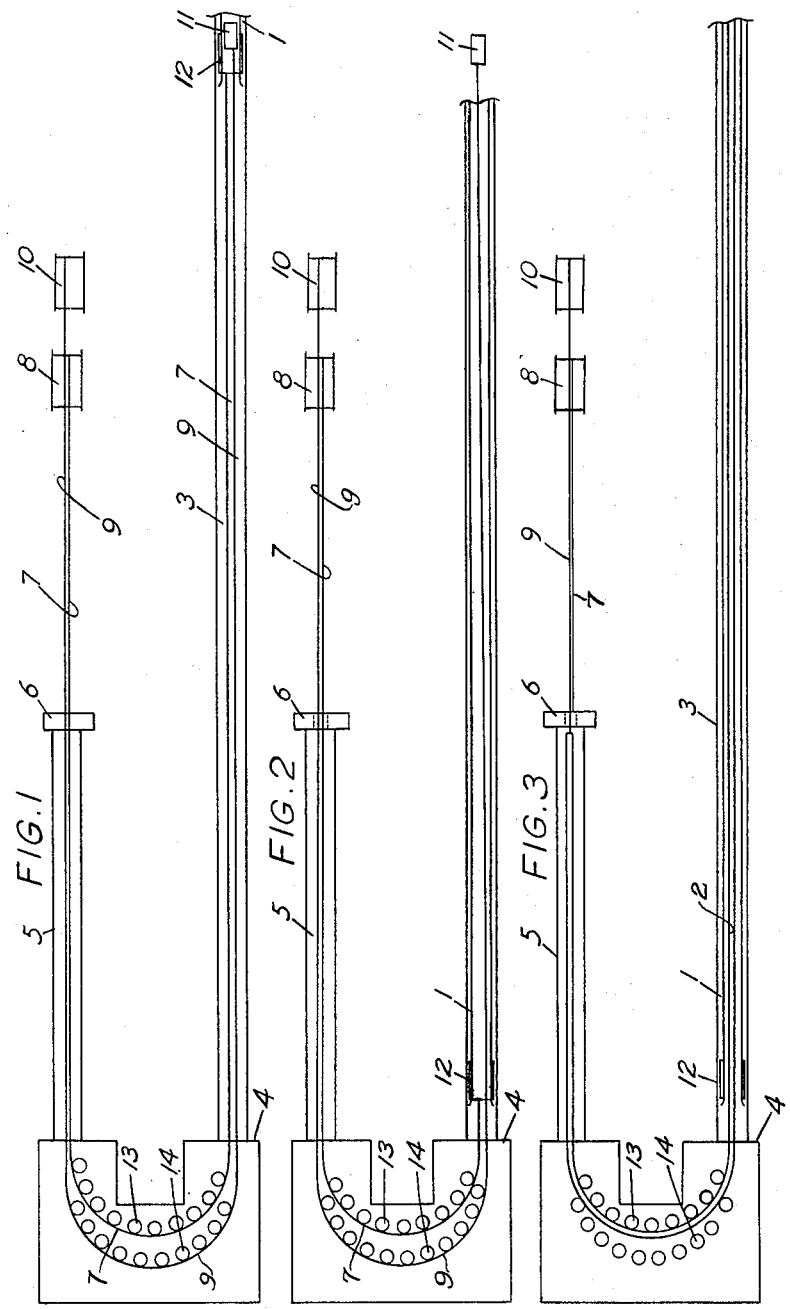
INVENTOR.
GEORGE THOMAS WILSON GRIEVE
BY
ATTORNEY

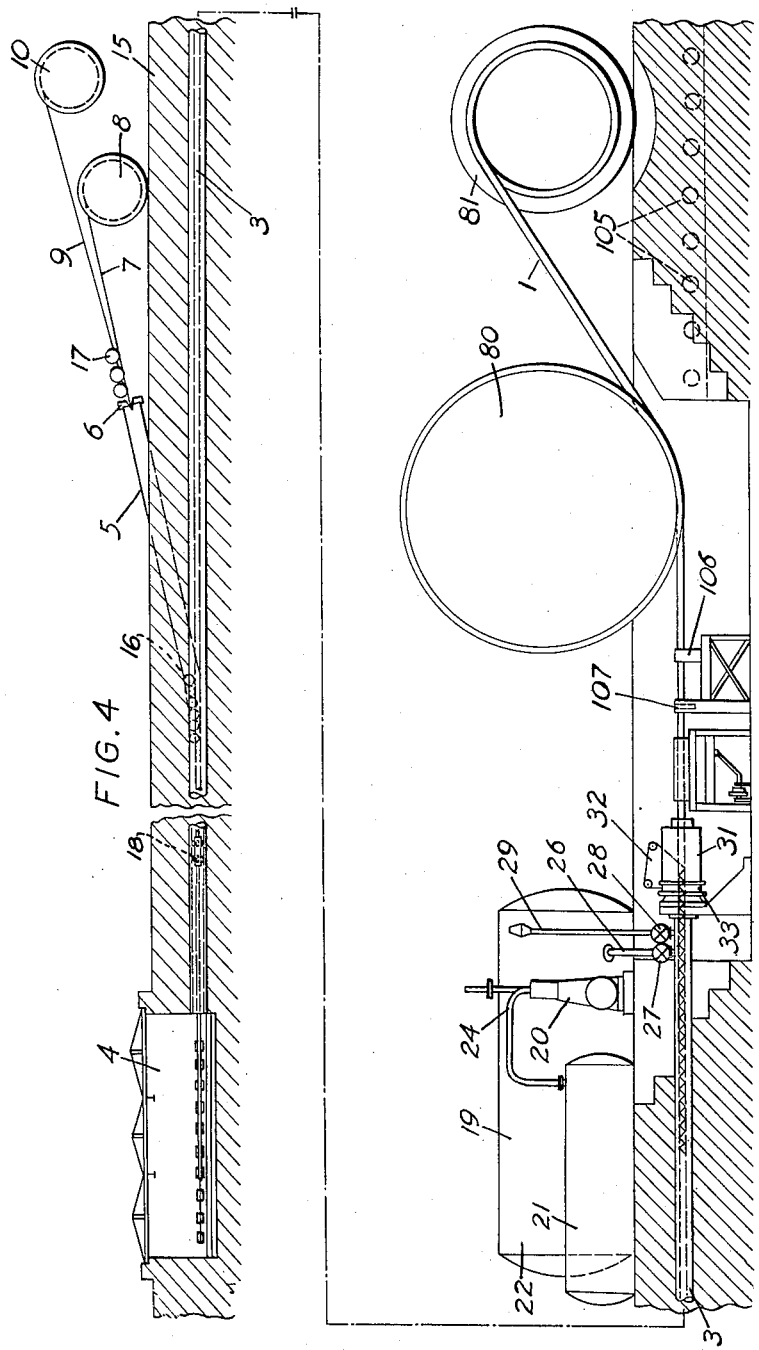

April 22, 1958 G. T. W. GRIEVE 2,831,656
APPARATUS FOR APPLYING METAL SHEATHS TO ELECTRIC CABLES
Original Filed Aug. 16, 1954
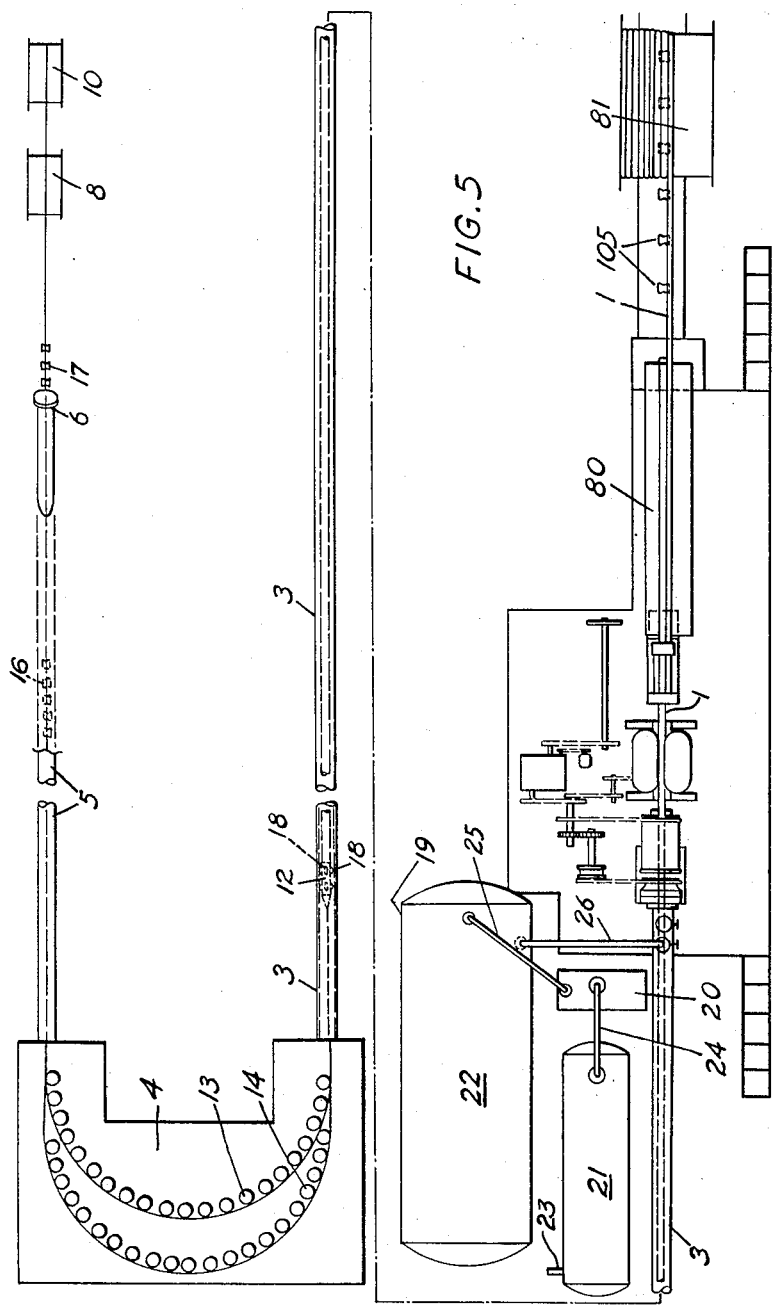
INVENTOR:
GEORGE THOMAS WILSON GRIEVE
BY
ATTORNEY April 22, 1958 G. T. W. GRIEVE 2,831,656
APPARATUS FOR APPLYING METAL SHEATHS TO ELECTRIC CABLES
Original Filed Aug. 16, 1954 6 Sheets-Sheet 4
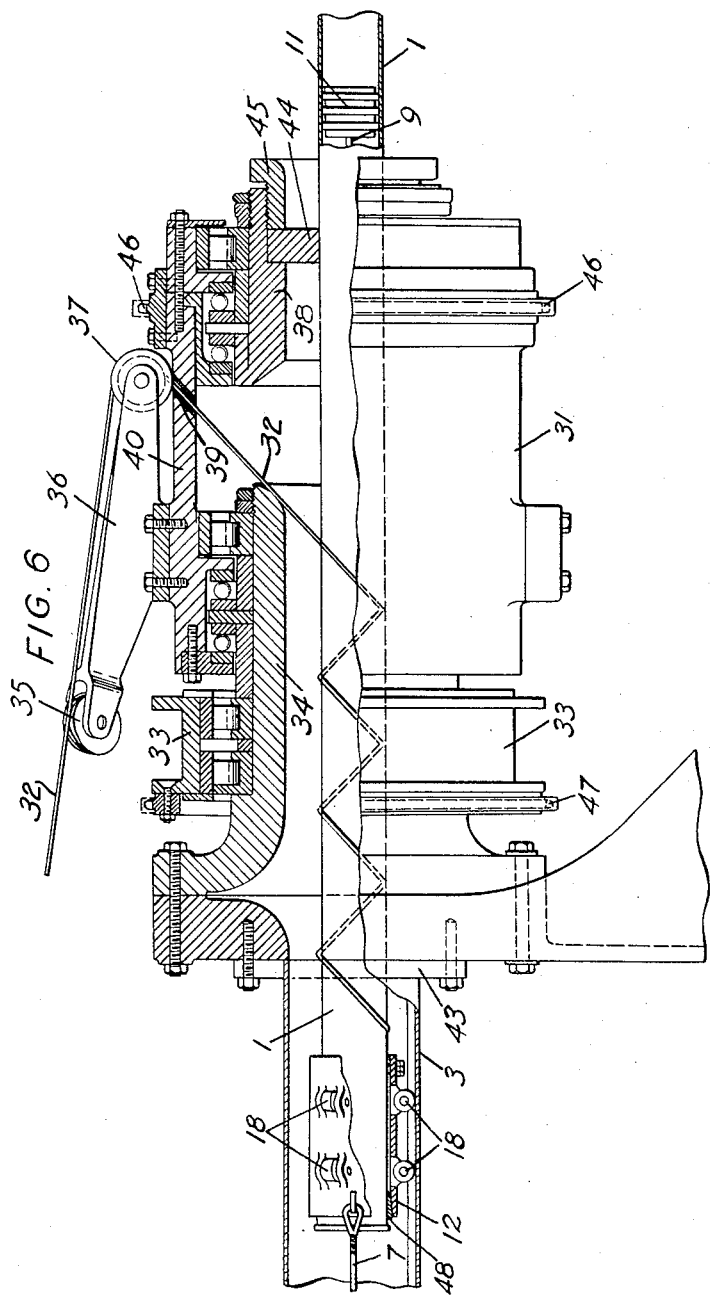
INVENTOR:
GEORGE THOMAS WILSON GRIEVE
BY James D. Bethell
ATTORNEY April 22, 1958 G. T. W. GRIEVE 2,831,656
APPARATUS FOR APPLYING METAL SHEATHS TO ELECTRIC CABLES
Original Filed Aug. 16, 1954 6 Sheets-Sheet 5
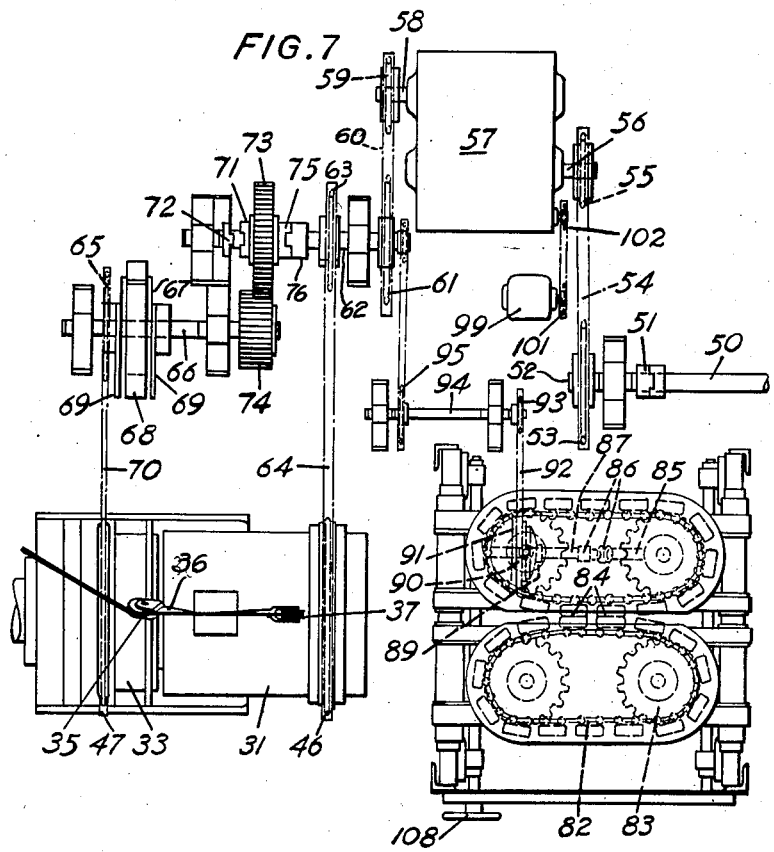

April 22, 1958     G. T. W. GRIEVE     2,831,656
APPARATUS FOR APPLYING METAL SHEATHS TO ELECTRIC CABLES
Original Filed Aug. 16, 1954     6 Sheets-Sheet 6

INVENTOR:
GEORGE THOMAS WILSON GRIEVE
BY James G. Bethell
ATTORNEY

United States Patent Office 2,831,656
Patented Apr. 22, 1958

2,831,656

APPARATUS FOR APPLYING METAL SHEATHS TO ELECTRIC CABLES

George Thomas Wilson Grieve, Woolwich, London, England, assignor to The Okonite Company, Passaic, N. J., a corporation of New Jersey Original application August 16, 1954, Serial No. 449,977. Divided and this application October 25, 1955, Serial No. 542,576

5 Claims. (Cl. 254—134.4)

This invention relates to the application of a sheath to an electric cable in which the body of the cable, viz., the insulated cable conductor, is drawn into an oversize tube, and the tube, with the body in it, is then drawn through a die or other reducing means, by which the tube is sunk to a fit on the body, being at the same time elongated. In this method usual steps of the procedure include the pulling out of the tube from a coil to a straight line and the drawing of the cable body from a coil into the interior of this tube until one end of the body coincides in position with one end of the tube, when the other end of the body usually projects out from the other end of the tube to a length which will be subsequently covered by the elongation of the tube. The tube, when being laid out, is drawn through some restraining device, such as a die of a diameter slightly smaller than the nominal tube diameter or a group of straightening rolls. In this way the original curvature is taken out of the tube, and it is laid out in a straight run.

For the purpose of drawing in the body of the cable it is necessary to thread a tow line through the tube, attach this to the cable core or body, and then pull the line and core back through the tube.

The present invention is concerned with means for laying out the tube and threading the tow line through it, these two operations being carried out simultaneously.

In accordance with my invention, a piston attached to one end of the tow line, the other end of which is anchored, is inserted into the leading end of the tube, and this tube is then drawn forward, for laying out, into a sufficiently enclosed space in which air is maintained under pressure. This pressure acts upon the piston within the tube so as to cause it to travel down the tube as the tube is drawn forward. Since the tow line is anchored, the piston remains fixed in space as the tube proceeds, and when the tube has been completely laid out, the piston has arrived at the trailing end of the tube and passed out of it, so that the end of the tow line is accessible for attachment to the cable body after removal of the piston.

The invention is preferably used with the method of working in which the movement of the tube during the sinking of the diameter is in the reverse sense to that which the tube has when being laid out. In that method the cable body is drawn into the tube until its trailing end coincides with the trailing end of the tube. At this stage the leading end of the cable body will project beyond the leading end of the tube. This method of working has the advantage that it can be carried out with a single aperture in the pressure chamber for the passage of the tube. This facilitates keeping the enclosure sufficiently staunch to maintain the pressure. It also has other advantages. In the following specification, in particular describing plant, this method of working will be assumed to be used.

The enclosed space containing air under pressure is preferably made as a chamber formed of a length of metal pipe which extends in a straight line for a distance equal to the maximum length of the oversize tube to be accommodated in the plant. An extension beyond this length for receiving the end of the cable body when it has been pulled through the tube may be made as a continuation of this straight line or may be bent around so as to reduce the total length of the plant.

It will be seen that some form of packing must be provided to permit the movement of the tube into the pressure chamber without excess leakage of compressed air taking place. Such packing may be arranged at the entrance to the chamber, for instance as a gland through which the tube slides. In an alternative arrangement the packing may be provided at the leading end of the tube, moving with it into the chamber, being, for instance, in the form of a piston in sliding contact with the walls of the chamber and having an aperture in which the leading end of the tube is fixed so as to be held securely therein without substantial leakage of air around it. This method of attachment may be conveniently provided by belling out the end of the tube and securing it with an appropriately shaped clamping ring to the leading face of the piston. The use of such a piston obviously requires greater uniformity of dimensions and smoothness of surface of the chamber than is necessary in the case where the gland is at the entrance to the chamber. The use of the piston will be practicable with a chamber in the form of a metal pipe of a type manufactured so as to have a smooth, uniform bore.

Protection for the surface of the tube as its slides along the bottom of the chamber, both when it is drawn in for the purpose of being laid out in a straight line and when it is being drawn out for the purpose of being reduced in diameter, may be provided by a helical lapping of wire applied to the tube (hereinafter referred to as the "skid wire"). Such a wire will be anchored to the leading end of the tube and will be drawn along with the tube. A single lapping with long open lay will suffice to keep the surface of the tube clear of the bottom of the chamber. It may be formed of a single wire or of a strand and may be circular or semi-circular, or other form, in cross-section. It can be applied by a head rotating around the axis of the tube as it enters the chamber and may be removed by reverse rotation of the head as the tube emerges from the chamber.

Coordination of the speed of rotation of the lapping head with the linear speed of movement of the tube may be effected in various ways for the purpose of obtaining a substantially uniform lay of the wire when it is being applied to the tube and for the purpose of rewinding the wire when it is being removed from the tube. In each case it is particularly desirable to avoid any slack developing in the wire. One method of doing this is to drive the head or control its speed from a friction wheel or other device running in contact with the tube. When rewinding the wire, a slipping coupling in the drive to the wire reel from the head permits the reel to be made to overrun so as to maintain the tension on the wire.

The invention will be described further with the aid of the accompanying drawings wherein:

Figs. 1–3 are purely diagrammatic sketches in plan, illustrating the general sequence of operations;

Figs. 4 and 5 are a side elevation and plan of one form of apparatus with some parts shown somewhat diagrammatically;

Fig. 6 is a half-sectional side elevation of some of the apparatus shown in Figs. 4 and 5 and drawn to a larger scale;

Fig. 7 is a plan of some of the mechanism;

Fig. 8 is a fragmentary end elevation; and

Figure 9:
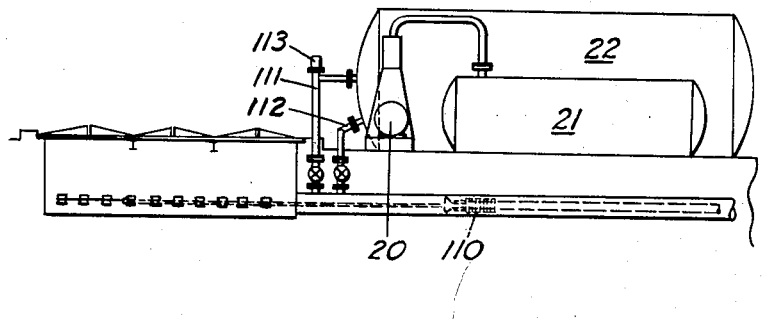
Figs. 9 and 10 are a side elevation and plan, respectively, of a modified part of the apparatus shown in Figs. 4 and 5.

The general sequence of operations to be carried out in the production of an electric cable will be described first of all with reference to Figs. 1–3 of the drawings. In Fig. 1 there is shown the leading end of a metal tube 1. In Figs. 2 and 3 the full length of the tube is shown. Into this tube is drawn a cable body 2 (see Fig. 3), and finally the tube and the cable body are drawn together through a die, which reduces the diameter of the tube and at the same time elongates the tube and causes it to make an appropriate fit upon the cable body.

The apparatus comprises a long straight pipe 3, into which the tube 1 is drawn, the pipe being closed in an air-tight manner at that end at which the tube 1 enters. At its opposite end the pipe terminates in an air-tight manner in an air-tight chamber 4, to which latter is connected a pipe 5. The latter makes an air-tight connection with the chamber 4 and is closed at its opposite end in an air-tight manner by a gland 6.

The pipe 3 is made of sufficient length to receive the longest length of tube 1 that will be required to be used, for example, 300 yards. As the pipe 5 receives but a part of the length of the cable body 2 and is not required to receive the tube 1, it may be made of somewhat smaller diameter than that of the pipe 3 and be made shorter than that pipe. The pipe 5, however, is made of sufficient length to accommodate the extra length of cable body 2 which is enclosed by the tube 1 when the latter is elongated by reducing its diameter.

Through the pipe 3, chamber 4, and pipe 5 are threaded a hawser 7 and a tow line 9. The hawser is connected at one end to a winch 8, and the tow line to a winch 10. Before the end of the tube 1 is inserted into the end of the pipe 3, a piston 11, which makes an air-tight fit in the tube 1, is attached to the free end of the tow line 9, and the free end of the hawser 7 is attached to the leading end of the tube 1. This attachment of the hawser to tube 1 may be made by placing a clamping ring 12 over the tube and belling out the end of the latter. The tube 1 is now ready to be drawn into the pipe 3 and is shown in this position in Fig. 1. The tube is drawn into the pipe by the hawser 7, which, as noted, has been threaded through the pipe, by operating the winch 8. While this is taking place, the piston 11 remains stationary, this being effected by the air pressure in the pipes 3 and 5 and the chamber 4 acting upon the piston 11 in a direction which maintains the tow line 9 taut, one end of the tow line being attached to the piston 11 and at its other end being attached to the winch 10. When the tube 1 has been drawn fully into the pipe 3, the tube being drawn over the stationary piston 11, the latter is available, as indicated in Fig. 2, so that it may be detached from the end of the tow line 9 and the leading end of the cable body 2 attached to the tow line in its place.

The cable body is now drawn into the tube 1 by the tow line 9 and winch 10, as indicated in Fig. 3, from which it will be seen that the cable body extends beyond the end of the tube 1, through the chamber 4, and terminates at the outer end of the pipe 5. The tube 1 and cable body 2 are next attached to each other at the free end of the pipe 1 and are drawn together through a die, which reduces the diameter of the tube 1 and elongates it, to cause it to fit the cable body and to enclose it for its full length.

To avoid fouling of the hawser 7 and tow line 9 in their passage through the chamber 4, they are caused to take separate curved paths, the hawser 7 being guided by rollers 13 in one curved path and the tow line 9 being guided by rollers 14 in another curved path. The rollers 13 also guide the cable body 2 when being drawn through the chamber 4 by the tow line 9. It will be seen that, after drawing the tube 1 into the pipe 3, the tow line 9 is immediately available for drawing the cable body 2 into the tube.

One arrangement for the general layout of the plant is shown in Figs. 4 and 5, to which reference will now be made. The pipe 3 and that portion of the pipe 5 adjacent the chamber 4 are laid below ground level, the latter being indicated by the line 15. The outer end of the pipe 5 slopes upwardly and is brought out at a point which is above ground level, as shown in Fig. 4. The hawser 7 and tow line 9 are guided by the rollers 13 and 14 in such a manner that, in passing through the chamber 4, they occupy curved paths which are well separated and which lie in a horizontal plane, as above explained. This side-by-side arrangement of the hawser and tow line is maintained in the pipe 5 by providing a set of rollers 16 for the hawser and tow line. Two sets of rollers 17 are also provided for the hawser and tow line beyond the pipe 5 adjacent its outer end to guide the hawser and tow line to their respective winches.

In describing the general sequence of operations with reference to Figs. 1–3, it has been stated that the hawser 7 is attached to the leading end of the tube 1 by a clamping ring 12 and by belling out the end of the tube. This clamping ring may be made in the form of a carriage provided with rollers which run on the inner surface of the pipe 3. These rollers are shown at 18 in Figs. 4 and 5 to facilitate the passage of the tube 1 through the pipe 3, particularly when the latter has a rough inner surface.

It has been described above with reference to Fig. 1 that a piston 11, attached to the free end of the tow line 9, is inserted into the leading end of the tube 1, and that the piston is held stationary by being subjected to air pressure while the tube 1 is being drawn over the piston into the pipe 3. The piston makes a substantially air-tight fit with the tube 1. Figs. 4 and 5 illustrate the apparatus employed for maintaining air pressure upon the piston 11. The apparatus is indicated generally by the reference numeral 19 and in this form of the plant is mounted adjacent the free end of the pipe 3. The apparatus comprises an air compressor 20, an air drier 21, and an air receiver 22. The compressor draws air from the atmosphere through a pipe 23 (Fig. 5), through the drier 21, and through pipe 24. After compression, the dried air is delivered to the receiver 22 through pipe 25 and is discharged therefrom through pipe 26, provided with a valve 27, to the interior of the pipe 3. By means of air compressor 20 the pipes 3 and 5 and the chamber 4 are maintained under air pressure, and this pressure acts upon the piston 11 to hold it stationary within the tube 1 and maintain the tow line 9 taut while the tube is being drawn into the pipe 3. The air receiver 22 is of large capacity, being made, for example, of twice the capacity of the pipes 3 and 5 and chamber 4, so as to ensure an ample supply of air at the required pressure to hold the piston 11 stationary and to compensate for any small air leakages in the system. The air pressure is not required after the tube 1 has been drawn into the pipe 3, and the system can be opened to atmosphere by opening a valve 28 in an exhaust pipe 29, connected to the pipe 3.

It will generally be desirable to provide a temporary protective covering for the tube 1 while it is being drawn into and out of the pipe 3, to avoid damage to the tube, particularly when the inner surface of the pipe 3 is rough or irregular. This protective covering may take the form of a wire of round, semiround, or other appropriate cross-section, wound around the tube 1 helically with a relatively long and open lay, while the tube is being drawn into that pipe. A device for effecting these operations is indicated by the general reference numeral 31, the wire, hereinafter referred to as a "skid wire," being shown at 32. The device, hereinafter referred to as a "winding head," is shown in greater detail in Fig. 6, to which reference will now be made.

The skid wire 32 to be wound on to the tube 1 is disposed on a reel 33, which is mounted for rotation upon a sleeve 34. The skid wire is taken off the reel and led over a guide pulley 35, mounted at one end of an arm 36, carrying at its other end a guide pulley 37. The arm 36 is mounted partly on the sleeve 34 and partly on a second sleeve 38, the two sleeves being of the same internal diameter and having their adjacent ends spaced from each other, the skid wire 32 being led off the guide pulley 37 through a slot 39 in a sleeve 40, to which the arm 36 is bolted, and on to the tube 1 as the tube is being drawn through the winding head 31. As the tube 1 is being drawn into the pipe 3, the sleeve 40 is rotated to carry the arm 36 around with it. This draws the skid wire 32 off the reel 33, and the wire is wound on to the tube 1 with a relatively long and open lay. When the tube 1 and the cable body 2 therein are being drawn together out of the pipe 3, the sleeve 40 carries the arm 36 around in the reverse direction, to unwind the skid wire 32 from the tube 1, and the wire is wound again onto the reel 33. This operation will be referred to later on herein. The winding head is supported horizontally by a standard 42.

In Fig. 6 the tube 1 is shown belled out at its leading end and with a clamping ring 12 attached to it, the hawser 7 attached to the clamping ring, and the latter having rollers 18 for bearing against the inner surface of the pipe 3. The figure also shows the piston 11 inside the tube 1 and the tow line 9 attached to the piston. The piston makes a substantially air-tight fit with the inner surface of the tube. The clamping ring 12 is held in place by a wedge 48.

The attachment of the hawser 7 to the clamping ring 12 and the placing of the latter in position upon the tube 1 and the belling out of the end of the tube and the attachment of the tow line 9 to the piston 11 and the insertion of the piston into the end of the tube are carried out before the tube 1 enters the winding head and before compressed air is admitted to the pipe 3. These operations may be carried out immediately in front of the winding head 31. The skid wire 32 must be attached to the tube 1, and this can be done by pulling the wire through the slot 39 and anchoring it to the tube adjacent the leading end thereof. At its rear end the winding head 31 has a jointing ring 43, bolted thereto, and the adjacent end of the pipe 3 makes an air-tight joint therewith. Some air will escape through the slot 39, but this will be compensated for by the pressure developed in the air receiver 22 and the capacity of the latter to ensure sufficient pressure for acting upon the piston 11 to maintain the piston stationary within the tube 1.

At its front end the winding head 31 has a gland ring 44, held in place by a gland nut 45. The ring 44 makes a close sliding fit with the tube 1 and is placed in position after the tube 1 with its clamping ring 12 has been drawn into the winding head.

The sleeve 40, which carries the arm 36, has attached to it a sprocket wheel 46, and the reel 33, which is rotated by the drawing off of the skid wire 32 therefrom, has attached to it a sprocket wheel 47.

To maintain the lay of the wire as it is laid on to the tube 1, it is necessary that the rate of longitudinal movement of the tube should be correlated with the speed of rotation of the sleeve 40 and arm 36, and that, should the rate of movement of the tube vary, a corresponding variation of movement should be imparted to the sleeve 40 and arm 36.

Referring to Fig. 7, the sprocket wheel 46, attached to the sleeve 40, is driven from a motor-driven shaft 50, connected through a clutch 51 to a shaft 52, to which latter is fixed a sprocket wheel 53. The sprocket wheel 53 is connected by a chain 54 to a sprocket wheel 55, mounted on a shaft 56, forming part of a variable speed gearing 57. A second shaft 58, forming part of the variable speed gearing 57, has fixed to it a sprocket wheel 59, connected by a chain 60 to a sprocket wheel 61, fixed to a shaft 62, to which latter is also fixed a sprocket wheel 63, which is connected by a chain 64 to the sprocket wheel 46 attached to the sleeve 40.

The drawing off of the skid wire 32 from the reel 33 causes the reel to rotate, this rotation being communicated from the sprocket wheel 47, fixed to the reel, through a chain 70 to a sprocket wheel 65. The sprocket wheel 65 is mounted freely on a shaft 66, and upon the latter is mounted a friction drum 67, which is fixed to that shaft. The drum 67 engages the inner surface of a casing 68, attached to arms 69, and the latter are attached to the boss of the sprocket wheel 65. As the skid wire is withdrawn from the reel 33, the sprocket wheel 65 is rotated but is braked by the drum 67, which is held stationary, inasmuch as the shaft 66 to which the drum 67 is fixed is being prevented from rotation by the engagement of a part 71 with a fixed part 72 of a dog clutch. The part 71 of the clutch is fixed to a pinion 73, which can rotate freely on the shaft 62 and can be slid along that shaft while remaining in engagement with a pinion 74, fixed to the shaft 66, which carries the drum 67.

After the cable body 2 has been drawn into the tube 1, those two members are attached to each other by any suitable means and drawn together through a drawing-down die, to reduce the tube in diameter and cause it to fit the cable body and to elongate the tube, so that it fully encloses the cable body over the whole length of the latter. During this part of the process, the skid wire 32 is being unwound from the tube 1 and being wound up again on to the reel 33, the latter being driven at an appropriate speed from the shaft 62 by the engagement of parts 75 and 76 of a dog clutch, part 75 being attached to pinion 73, and part 76 being fixed to shaft 62. The drive will then be from the shaft 62, clutch parts 76 and 75, pinions 73 and 74, to the shaft 66, and from thence to the drum 67, casing 68, arms 69, to the sprocket wheel 65, and from thence through the chain 70 to the sprocket wheel 47. The sprocket wheel 46 will also be driven from the shaft 62 through the chain wheel 63 and sprocket 64. It will, of course, be understood that the sprocket wheel 46 and sprocket wheel 47 will be rotated in the reverse direction while the tube 1 and cable body 2 are being drawn through the drawing-down die to that when the tube 1 is being drawn into the pipe 3. During the winding of the skid wire 32 on to the reel 33, the latter will be rotated at such a speed as to ensure that the wire does not become slack.

While the cable body 2 is being drawn into the tube 1, the motor-driven shaft 50 will be uncoupled at clutch 51 from the gearing, so that the arm 36 and skid wire reel 33 will be stationary.

As described above, the tube 1 is drawn into the pipe 3 by the winch 8. The tube, together with the cable body 2, is drawn out of the pipe 3 by a draw drum 80 and a take-up drum 81, as shown in Figs. 4 and 5. During both of these operations, the sprockets wheel 46, attached to the sleeve 40, carrying the arm 36, and the sprocket wheel 47, attached to the reel 33, are rotating. To retain a predetermined angle of lay of the wire 32 in relation to the tube 1, it is necessary, as indicated above, that variations in linear speed of the tube 1 should cause corresponding variations in speed of rotation of the arm 36, the latter, for example, being caused to rotate faster if the linear speed of the tube 1 increases. The mechanism for effecting this result will now be described.

The linear movement of the tube 1 is communicated to a pair of endless chains 82, provided with sprocket wheels 83 and with gripping members 84, which latter are adapted to engage frictionally the periphery of the tube 1. One of the sprocket wheels is connected by a universal joint to a shaft 85, and the latter is connected through a universal joint 86 to one end of a shaft 87. The shaft 87 has fixed to it a sun wheel 88, forming part of a sun and planet gearing and comprising a planet wheel 89, meshing with the sun wheel 88 and with an outer, toothed wheel 90. The planet wheel 89 is attached to a plate 91, and the wheel 90 is connected by a chain 92 to a sprocket wheel 93, fixed to a shaft 94, to which also is fixed a sprocket wheel 95. The latter is connected by a chain 96 to a sprocket wheel 97, fixed to the shaft 66.

If it is assumed that the linear speed of the tube 1 and the speed of rotation of the winding head are remaining constant, the planet wheel 89 does not rotate about the axis of the shaft 87, and the plate 91 remains stationary. On the other hand, if the linear speed of the tube 1, say, increases, the planet wheel rotates more quickly about its axis, and the plate 91 is turned. If the linear speed of the tube 1 decreases, the plate 91 is turned in the opposite directio. These movements of the plate are utilized to operate switches 98 (Fig. 8) to close the circuits of a geared, reversible electric motor 99, which is driven in one direction or the other to vary appropriately the speed of the variable speed gear 57, the motor 99 being connected to the latter by a chain 100, passing over a sprocket wheel 101 on the motor shaft and over a sprocket wheel 102 on a shaft of the variable speed gear 57. The changes of speed of the latter are communicated to the sprocket wheel 61, shaft 62, sprocket wheel 63, chain 64, and sprocket wheel 46 to the arm 36 of the winding head. If the plate 91 is not operating one or the other of the switches 98, the motor 99 is not functioning, and the linear speed of the tube 1 and of the rotating arm 36 are remaining steady, and the skid wire 32 is being wound on to the tube 1 with the predetermined lay or is being removed from the tube and being wound on to the reel 33 without slack in the wire. During the unwinding of the skid wire from the tube 1, the reel 33 will be required to be driven at a greater speed than the arm 36.

Referring to Fig. 8, the plate 91 carries at its lower part a curved shoe 103, which makes a frictional engagement with the plate. The switches 98 have plungers 104 for engagement by the shoe 103, one or other of the plungers being operated to close the corresponding circuit of the motor 99 according to the direction of the movement of the plate 91 about its axis.

Irrespective of the direction of movement of the tube 1, any increase in its linear speed will require an increase in speed of rotation of the arm 36, although, of course, the direction of rotation of that arm will depend upon whether it is winding the skid wire 32 on to the tube 1 or is unwinding it therefrom. If the arm 36 is winding the skid wire on to the tube, an increase of speed of the linear movement of the tube will cause a movement of the plate 91 in one direction and the actuation of the corresponding switch 98. On the other hand, if the arm 36 is unwinding the skid wire from the tube 1, it will be rotating in the reverse direction, so that an increase in the linear speed of the tube will result in the plate 91 operating the other of the two switches 98. Before commencing the unwinding of the skid wire 32 from the tube 1, the connections from the switches 98 to the motor 99 will be required to be reversed.

When drawing the tube 1 into the pipe 3, it is drawn off a drum, not shown, on to rollers 105, see Figs. 4 and 5, which are disposed substantially in alignment with the pipe and form a straight runway for the tube. The rollers 105 will also be used for supporting the cable body 2 as it is being drawn off its supply drum into the tube 1. After the tube 1 and cable body 2 have been attached to each other, they are drawn out of the pipes 3 and 5 and chamber 4 by the draw drum 80, the sheathed cable body being taken from the draw drum on to the take-up drum 81. The attachment of the cable body to the tube may be effected by any convenient form of crimping device 106. When the tube 1 is being drawn off its supply drum over the rollers 105, it may be drawn through some form of straightening device. This may consist of a die or appropriately mounted rollers. To reduce the diameter of the tube 1 after its attachment to the cable body 2, it is drawn through a sinking die. This latter and the straightening device are carried by a support 107.

The endless chains 82 (Fig. 7) carrying the gripping members 84 are moved apart by turning a handle 108 during the drawing of the cable body 2 into the pipe 3 and through the chamber 4 into the pipe 5, the arm 36 and the reel 33 then being stationary.

In Figs. 4 and 5, the compressor and the apparatus associated therewith are shown mounted at the free end of the pipe 3 for the delivery of compressed air to that pipe adjacent that end. In the construction shown in those figures, the free end of the pipe 5 is closed in a substantially air-tight manner by the gland 6, and the pipe 3 is connected in an air-tight manner to the front end of the winding head 31, which provides, in conjunction with the tube 1, a substantially air-tight chamber, the passage 39 (Fig. 6) for the skid wire 32 being packed so that the passage is closed in a substantially air-tight manner by the packing acting in conjunction with the skid wire. The piston 11 placed in the tube 1 prevents any substantial air leakage past that point.

Figure 10:
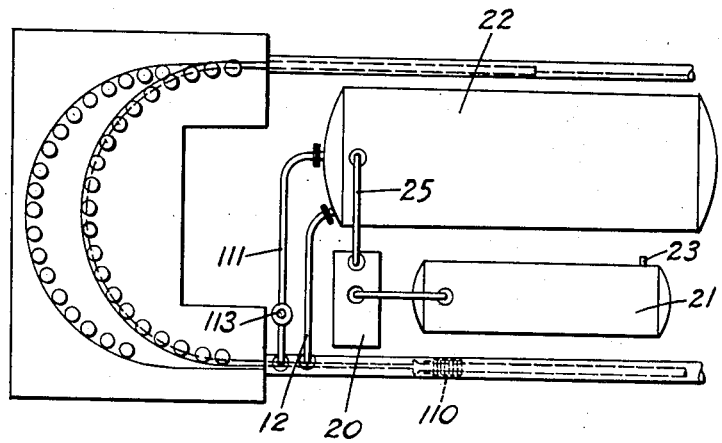

In the arrangement shown in Figs. 3 and 10 the piston 11 is placed as before in the tube 1 and is held stationary while the tube is being pulled over the piston into the pipe 3, but a somewhat simplified sealing arrangement for the pipe system is provided by the fitting of a piston to the leading end of the tube 1. This piston is shown at 110 and may consist of a number of packing rings fixed in position to the clamping ring 12 placed over the leading end of the tube 1, the latter being subsequently belled out, as previously described. The function of the piston 110 is to seal the pipe 3 while the tube 1 is being drawn into that pipe by the hawser 7. The air compression apparatus comprises an air compressor 20, a drier 21, and a receiver 22 of large capacity. Compressed air is delivered to the pipe 3 at a place adjacent its connection to the air-tight chamber 4, through a pipe 111. As the tube 1 is drawn into the pipe 3, the volume under pressure decreases in the pipe system. Compressed air may be returned to the air receiver through a pipe 114 by way of a loaded valve 113.

The arrangement shown in Figs. 9 and 10 is suitable when the bore of the pipe 3 is smooth, so that an airtight fit can be obtained and retained between the piston 110 and the inner surface of the pipe during the drawing-in of the tube 1 into the pipe. This is of advantage since the pipe system is sealed at the free end of the pipe 3 by the piston carried by the tube 1, so that no special means need be provided for maintaining the free end of the pipe 3 sealed.

It is realized that there will be some loss of compressed air in the plant shown in Figs. 4 and 5, and that there will be some loss taking place at the free end of the pipe 5 of Figs. 9 and 10, but the plant in each case will provide a sufficiently air-tight enclosure to enable the compressed air to act with sufficient pressure to hold the piston in the tube stationary while the tube is being drawn over it.

In each case the pipe 3 will be made of large enough diameter for the tube to be drawn in with a substantial clearance between the tube and the inner surface of the pipe, and the air-tight chamber connecting the adjacent ends of pipes 3 and 5 will be of larger cross-section than the pipe 3, to enable the guide rollers 13 and 14 therein to provide well separated curved paths for the hawser 7 and tow line 9.

It will be seen that an arrangement in accordance with the invention provides completely enclosed runs of straight pipe, which may be placed underground, if desired, or, if run at ground level or higher, offer small obstruction, and, where any supports are needed, they can be of simple construction.

This application is a division of my copending application Serial No. 449,977, filed August 16, 1954, Application of Sheaths to Electric Cables.

What I claim is:

1. Apparatus for sheathing an electric cable body by drawing it by a tow line into an oversize tube which has been laid out straight and reducing the diameter of the tube to elongate it and cause it to fit on the cable body, the said apparatus comprising a straight pipe of sufficient length to receive the tube, a piston fitting said tube, a tow line threaded through the pipe for attachment at one end to said piston, means for holding the tow line at its opposite end, means for drawing the tube over the piston into the pipe, and means for maintaining the interior of the pipe under pressure for acting upon said piston to hold the piston stationary during the drawing of the tube.

2. Apparatus for sheathing an electric cable body by drawing it by a tow line into an oversize tube which has been laid out straight and reducing the diameter of the tube to elongate it and cause it to fit on the cable body, the said apparatus comprising a straight pipe of sufficient length to receive the tube; a second shorter pipe, the two pipes being laid side by side; an air-tight chamber connecting the adjacent ends of the two pipes, the two pipes and the chamber forming a sufficiently air-tight enclosure; a hawser for drawing the tube into the first-mentioned pipe, said hawser being threaded through the enclosure for attachment at one end to the tube; a piston fitting said tube; a tow line threaded through the enclosure for attachment at one end to said piston; means for holding the tow line at its opposite end; hawser-guiding means and tow-line-guiding means mounted within the air-tight chamber, the two guiding means being spaced apart to prevent fouling of the hawser and tow line; and means for maintaining the enclosure under pressure for acting upon the piston to hold it stationary during the drawing in of the tube over the piston into the first-mentioned pipe.

3. Apparatus for sheathing an electric cable body by drawing it by a tow line into an oversize tube which has been laid out straight and reducing the diameter of the tube to elongate it and cause it to fit on the cable body, the said apparatus comprising a straight pipe of sufficient length to receive the tube; a hawser for drawing the tube into the pipe, said hawser being threaded through the pipe; a fitting for attaching the hawser to the tube with a clearance between fitting and pipe; a piston fitting the tube; a tow line threaded through the pipe for attachment at one end to said piston; means for holding the tow line at its opposite end; means for maintaining the interior of the pipe under pressure for acting upon the piston to hold it stationary during the drawing of the tube over it into the pipe, said pressure means being in communication with the pipe adjacent the end thereof remote from that at which the tube enters the pipe; and means carried by the tube for sealing the said clearance between the inner surface of the pipe and the hawser-attachment means carried by the tube.

4. Apparatus for sheathing an electric cable body by drawing it by a tow line into an oversize tube which has been laid out straight and reducing the diameter of the tube to elongate it and cause it to fit on to the cable body, the said apparatus comprising a straight pipe of sufficient length to receive the tube; a hawser for drawing the tube into the pipe, said hawser being threaded through the pipe for attachment to the tube; a piston fitting the tube; a tow line threaded through the pipe for attachment to said piston; means for holding the tow line at its opposite end; means for maintaining the interior of the pipe under pressure for acting upon the piston to hold it stationary during the drawing of the tube over the piston into the pipe, and means for winding a wire helicaly around the tube while the tube is being drawn into the pipe.

5. Apparatus for sheathing an electric cable body by drawing it by a tow line into an oversize tube which has been laid out straight and reducing the diameter of the tube to elongate it and cause it to fit on the cable body, the said apparatus comprising a straight pipe of sufficient length to receive the tube; a hawser for drawing the tube into said pipe, said hawser being threaded through the pipe for attachment to the tube; a piston fitting said tube; a tow line threaded through the pipe for attachment of one end to said piston; means for holding the tow line at its opposite end; means for maintaining the interior of the pipe under pressure; means for winding a wire helically around the tube as the tube is being drawn into the pipe by said hawser; and a device engaging the tube frictionally for controlling the speed of rotation of the winding means.

References Cited in the file of this patent
UNITED STATES PATENTS

| | | |
|---|---|---|
| 734,508 | Buschner | July 28, 1903 |
| 2,558,855 | Knewstubb et al. | July 3, 1951 |
| 2,602,766 | Francis | July 8, 1952 |
| 2,676,389 | Conning | Apr. 27, 1954 |
| 2,689,039 | Read | Sept. 14, 1954 |
| 2,694,661 | Meyer | Nov. 16, 1954 |